United States Patent [19]

Morini et al.

[11] Patent Number: 5,106,807
[45] Date of Patent: Apr. 21, 1992

[54] COMPONENTS AND CATALYSTS FOR THE POLYMERIZATION OF OLEFINS

[75] Inventors: Giampiero Morini, Pavia; Enrico Albizzati, Novara; Umberto Giannini, Milan; Luisa Barino, Novara; Raimondo Scordamaglia, Milan; Elisabetta Barbassa, Voghera, all of Italy

[73] Assignee: Himont Incorporated, Wilmington, Del.

[21] Appl. No.: 638,289

[22] Filed: Jan. 4, 1991

[30] Foreign Application Priority Data

Jan. 10, 1990 [IT] Italy ............... 19039 A/90

[51] Int. Cl.$^5$ ........................... C08F 4/649
[52] U.S. Cl. ................... 502/121; 502/122; 502/124; 502/125; 502/127; 526/125
[58] Field of Search .......... 502/125, 127, 121, 122, 502/124

[56] References Cited

U.S. PATENT DOCUMENTS

| | | | |
|---|---|---|---|
| 4,033,902 | 7/1977 | Lengnick | 502/174 |
| 4,107,414 | 8/1978 | Giannini et al. | 502/127 X |
| 4,149,990 | 4/1979 | Giannini et al. | 252/429 |
| 4,226,741 | 10/1980 | Luciani et al. | 252/429 |
| 4,277,589 | 7/1981 | Giannini et al. | 526/122 |
| 4,318,819 | 3/1982 | Malloy et al. | 502/401 X |
| 4,329,253 | 5/1982 | Goodall et al. | 502/125 X |
| 4,331,561 | 5/1982 | Luciani et al. | 252/429 |
| 4,335,015 | 6/1982 | Imai et al. | 502/125 X |
| 4,395,360 | 7/1983 | Albizzati et al. | 252/429 |
| 4,460,700 | 7/1984 | Candlin et al. | 502/127 X |
| 4,464,478 | 8/1984 | Scatá et al. | 502/111 |
| 4,473,660 | 9/1984 | Albizzati et al. | 502/124 |
| 4,507,448 | 3/1985 | Koroda et al. | 502/125 X |
| 4,522,930 | 6/1985 | Aubizatti et al. | 502/124 X |
| 4,626,519 | 12/1986 | Miro et al. | 562/125 X |

*Primary Examiner*—Patrick P. Garvin

[57] ABSTRACT

Disclosed are solid catalyst components for the polymerization of olefins comprising a titanium halide or titanium alkoxy halide, and an electron-donor compound selected from silicon compounds of the formula

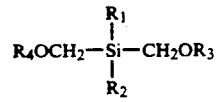

where $R_1$, $R_2$, $R_3$ and $R_4$ are hydrocarbyl radicals, supported on a magnesium halide in active form.

Also disclosed are catalysts obtained from said catalyst components and from an Al-alkyl compound, as well as catalysts obtained by the reaction of an Al-alkyl compound and a silicon compound of the formula above with a solid catalyst component comprising a titanium halide or halogen alcoholate and an electron-donor compound having specific characteristics of extractability with Al-triethyl, supported on an active magnesium halide.

9 Claims, No Drawings

COMPONENTS AND CATALYSTS FOR THE POLYMERIZATION OF OLEFINS

The present invention relates to catalyst components and catalysts for the polymerization of olefins and their use particularly in the polymerization of $CH_2$=CHR olefins, where R is a 1-6 carbon linear or branched alkyl radical, an aryl radical or a hydrogen atom.

The catalysts comprising titanium compounds supported on magnesium halides in active form are well known in the field of olefins polymers.

Catalysts of this type are described, for instance, in U.S. Pat. No. 4,278,718.

Said catalysts, although being highly active in the polymerization of ethylene as well as other alpha-olefins, such as propylene, are not sufficiently stereospecific.

The stereospecificity was improved by adding an electron-donor compound to the solid component comprising the titanium compound supported on magnesium halides in active form (U.S. Pat. No. 4,544,713).

Further improvements were obtained by using an electron-donor compound added to the solid component (inside donor) as well as one added to the Al-alkyl compound (outside donor) as described in U.S. Pat. No. 4,107,414.

Very high performances, both in terms of activity and stereospecificity, are provided by the catalysts described in European patent 0045977. Said catalysts contain, as the solid component a magnesium halide in active form on which a (HM 3983 USA) titanium halide ($TiCl_4$) and an electron-donor compound, selected from specific classes of carboxylic acids esters of which the phthalates are representative, are supported. The co-catalyst used is an Al-alkyl compound to which a silicon compound containing at least one Si—OR bond (R=hydrocarbyl radical) is added.

In U.S. Pat. No. 4,522,930 are described catalysts whose solid catalyst component is characterized by the fact that it contains an electron-donor compound extractable with triethyl (under standard extraction conditions) for at least 70% of the moles, and that it has, after extraction, a surface area of at least 20 m²/g. Said catalysts comprise, as co-catalyst, an Al-trialkyl compound to which an electron-donor compound is added which does not form complexes with the Al-triethyl which can be detected by potentiometric titration under standard reaction conditions. The electron-donor compounds mentioned above include silicon compounds with Si-OR bonds, such as 2,2,6,6-tetramethylpiperidine, 2,2,5,5-tetramethylpiperidine, Al-diethyl-2,2,6,6-tetramethylpiperidide, Al-dichloromonophenoxy, and other compounds.

Now unexpectedly a new class of electron-donor compounds has been found, some of which can be used together with an Al-alkyl to form, in combination with solid catalyst components having the characteristics described in U.S. Pat. No. 4,522,930, highly active and stereospecific catalysts, and others being capable of providing, when added to the solid catalyst components, highly active and sterospecific catalysts even without the addition of an electron-donor compound to the Al-alkyl compound.

The compounds of the invention are silanes of the following general formula:

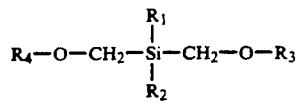

Where $R_1$ and $R_2$ are the same or different and are linear or branched $C_{1-18}$ alkyl, $C_{3-18}$ cycloalkyl, $C_{6-18}$ aryl, $C_{7-18}$ alkaryl, or $C_{7-18}$ aralkyl radicals, optionally containing O, N, S, P, or halogens; $R_3$ and $R_4$, are the same or different and are linear or branched $C_{1-8}$ alkyl, $C_{3-18}$ cycloalkyl, $C_{6-18}$ aryl, $C_{7-18}$ alkaryl or aralkyl radicals, and preferably alkyl radicals with 1-6 carbon atoms, most preferably methyl radicals.

In particular $R_1$ and $R_2$ are methyl, ethyl, propyl, isopropyl, n-butyl, tert-butyl, sec-butyl, neo-pentyl, 2-ethylhexyl, cyclohexyl, methylcyclohexyl, phenyl, benzyl, p-chlorophenyl, 1-naphthyl or 1-decahydronaphthyl.

Examples representative of silanes of the formula above include: 2-ethylhexyl-trimethoxymethylsilane, isopropyl-trimethoxymethylsilane, methyl-trimethoxymethylsilane, n-butyl-trimethoxymethylsilane, isobutyl-trimethoxymethylsilane, secbutyl-trimethoxymethylsilane, tert-butyl-trimethoxymethylsilane, cyclohexyl-trimethoxymethylsilane, phenyl-trimethoxymethylsilane, cumyl-trimethoxymethylsilane, phenylethyl-trimethoxymethylsilane, cyclohxeylethyl-trimethoxymethylsilane, p-chlorophenyl-trimethoxymethylsilane, 1-naphthyl-timethoxymethylsilane, p-fluorophenyl-trimethoxymethylsilane, 1-decahydronaphthyl-trimethoxymethylsilane, p-tert-butylphenl-trimethoxymethylsilane, dicyclohexyl-dimethoxymethylsilane, dimethyl-dimethoxymethylsilane, diethyl-dimethoxymethylsilane, di-n-propyl-dimethoxymethylsilane di-isopropyl-dimethoxymethylsilane, di-n-butyl-dimethoxymethylsilane, di-isobutyl-dimethoxymethylsilane, di-sec-butyl-dimethoxymethylsilane, di-tert-butyl-dimethoxymethylsilane, dimethyl-diethoxymethylsilane, diethyl-diethoxymethylsilane, di-n-propyl-diethoxymethylsilane di-isopropyl-diethoxymethylsilane, di-n-butyl-diethoxymethylsilane, di-isobutyl -diethoxymethylsilane, di-sec-butyl-diethoxymethylsilane, di-tert-butyl-diethoxymethylsilane, methyl-ethyl-dimethoxymethylsilane, methyl-propyl-dimethoxymethylsilane, methyl-benzyl-dimethoxymethylsilane, methyl-phenyl-dimethoxymethylsilane, methyl-cyclohexyl-dimethoxymethylsilane, methyl-cyclohexylmethyl-dimethoxymethylsilane, bis (p-chlorophenyl) -dimethoxymethylisilane, bis(phenylethyl)-dimethoxymethylsilane, bis(cyclohexyl)-dimethoxymethylsilane, methyl-isobutyl-dimethoxymethylsilane, methyl -2-ethylhexyl -dimethoxymethylsilane, bis(2-ethylhexyl)-dimethoxymethylsilane, bis(p-methylphenyl)-dimethoxymethylsilane, methyl-isopropyl-dimethoxymethylsilane, diphenyl-dimethoxymethylsilane, cyclohexyl-tert-butyl-dimethoxymethylsilane, isopropyl-tert-butyl-dimethoxymethylsilane, dibenzyl-dimethoxymethylsilane, bis(cyclohexylmethyl)-dimethoxymethylsilane, di-isobutyl-di-isobutoxymethylsilane, isobutyl -isopropyl -dimethoxymethylsilane, di-cyclopentyl-dimethoxymethylsilane, di-neo-pentyl-dimethoxymethylsilane, isopentyl-isopropyl-dimethoxymethylsilane, phenyl-benzyl-dimethoxymethylsilane, cyclohexyl-cyclohexylmethyl-dimethoxymethylsilane, isopropyl-tertbutyl-dimethoxymethylsilane, isopropyl-tert-butyl-di-n-butoxymethylsilane, isopropyl -tert-butyl-di-isobutoxymethylsilane, isopropyl-tert-butyl-di-tert-butoxymethylsilane, methyl-cyclohexyl-diethoxymethylsilane, methyl-cyclohexyl-di-n-butoxymethylsilane, methyl-cyclohexyl-di-isobutoxymethylsilane, methyl-cyclohexyl-di-tert-butoxymethylsilane, tetramethoxymethylsilane, tetraethoxymethylsilane, tetra-n-butoxymethylsilane, butoxymethylsilane, tetra-tertbutoxymethylsilane.

A general method for the preparation of silicon compounds of the invention comprises in reacting a dialkyldichlorosilane or dialkyldimethoxysilane with the Grignard of the methylchloromethyl ether, or in reacting the dialkylbis(chloromethyl)silane with sodium methylate. The reaction is carried out at temperatures from 40° C. to 100° C. in an inert solvent.

As already indicated, the electron-donor compounds of this invention can be used together with Al-alkyl compounds to form, in combination with the solid catalyst components described in U.S. Pat. No. 4,522,930, highly active and stereospecific catalysts. The catalyst components described in this U.S. Patent include a titanium compound containing a Ti-halogen bond and an electron-donor compound at least 70% in moles of which is extractable with Al-triethyl under standard extraction conditions. After extraction, the solid has a surface area (B.E.T.) of at least 20 m²/g and usually from 100 to 300 m²/g.

The electron-donor compounds that can be used in the preparation of the solid catalyst components described in said U.S. Patent include ethers, ketones, lactones, compounds containing N, P and/or S atoms, and specific types of esters. Besides the esters of U.S. Pat. No. 4,522,930, the classes of esters described in European patent No. 0045977 can also be used.

Particularly suitable are the phthalic acid esters, such as diisobutyl, dioctyl, diphenyl and benzyl-butylphthalate; malonic acid esters, such as diisobutyl and diethylmalonate; the alkyl and arylpivalates; alkyl, cycloalkyl and aryl maleates; alkyl and aryl carbonates, such as diisobutyl carbonate, ethyl-phenyl carbonate and diphenyl carbonate; are succinic acid esters, such as mono and diethyl succinate. The phthalic acid esters are preferred.

The preparation of the solid catalyst components containing the silicon compound according to the invention is carried out using various methods.

For example, the magnesium halide (used in the anhydrous state containing less than 1% water), the titanium compound and the silicon compound are ground together under conditions in which the magnesium halide is activated. The ground product is then treated one or more times with excess TiCl₄ at a temperature from 80° to 135° C., and then washed repeatedly with a hydrocarbon (hexane) solvent until there are no chlorine ions present in the wash.

According to another method, the anhydrous magnesium halide is preactivated according to known methods and then reacted with an excess of TiCl₄ containing in solution the silicon compound. Also in this case the operation takes place at a temperature from 80° to 135° C. The treatment with TiCl₄ is optionally repeated and the solid is then washed with hexane or heptane to remove any TiCl₄ which has not reacted with the support.

According to another method, a MgCl₂nROH adduct, preferably in the form of spheroidal particles, where n is generally from 1 to 3, and ROH is ethanol, butanol or isobutanol, is reacted with an excess of TiCl₄ containing in solution the silicon compound at a temperature usually from 80 to 120° C. After the reaction is completed, the solid is reacted once more with TiCl₄, separated and washed with a hydrocarbon until no chlorine ions appear in the wash.

According to yet another method, alkoxy magnesium and alkoxy magnesium chloride compounds (the alkoxy magnesium chloride can be prepared particularly as described in U.S. Pat. No. 4,220,554) are reacted with excess TiCl₄ containing in solution the silicon compound, under the reaction conditions described herein above.

According to another method, magnesium halide complexes with alkoxy titanium compounds, such as MgCl₂2Ti(OC₄H9)4 complex, are reacted, in hydrocarbon solution, with excess TiCl₄ containing in solution the silicon compound and filtered; the solid product is reacted again with excess TiCl₄, separated and washed with hexane. The reaction with the TiCl₄ is carried out at a temperature from 80° to 120° C.

According to another embodiment, the complex between MgCl₂ and the alkoxy titanium compound is reacted in a hydrocarbon solution with methylhydropolysiloxane and filtered. The solid product is reacted at 50° C. with silicon tetrachloride containing in solution the silicon compound. The solid is then reacted with excess TiCl₄ operating at 80° to 120° C.

Also, it is possible to react with excess TiCl₄ containing in solution the silicon compound, porous resins, such as styrene-divinylbenzene resins, partially crosslinked and in the form of spheroidal particles, or porous inorganic oxides, such as silica and alumina, impregnated with solutions of Mg compounds or complexes soluble in organic solvents.

The porous resins that can be used are described in U.S. Ser. No. 359,234, filed May 31, 1989, and now abandoned, corresponding to published European patent application EP-A-0344755.

The reaction with TiCl₄ is carried out at 80° to 120° C. After separating any unreacted TiCl₄, the reaction is repeated and the solid is then washed with a hydrocarbon solvent until the wash is free of chlorine ions.

The molar ratio of MgCl₂/electron-donor compound used in the reactions mentioned above is usually from 2:1 to 12:1.

The electron-donor compound is fixed on the magnesium halide usually in a amount from 5 to 20 mole percent.

However, in the case of components supported on porous resins and inorganic oxides, the molar ratio between the silicon compound and the magnesium is different, and is usually from 0.1 to 1.

In the solid catalyst components the Mg/Ti molar ratio is generally from 30:1 to 4:1. In the components supported o porous resins or inorganic oxides the ratio is different and is usually from 10:1 to 2:1.

The titanium compounds that can be used for the preparation of the solid catalyst components are the titanium halides and alkoxy titanium halides. The preferred compound is the titanium tetrachloride.

Satisfactory results are obtained also with the titanium trihalides, particularly the TiCl₃HR, TiCl₃ ARA, and with alkoxy titanium halides, such as TiCl₃OR, where R is a phenyl radical.

The reactions indicated above lead to the formation of magnesium halide in active form. Reactions which lead to the formation of magnesium halide in active form starting from magnesium compounds which are different from the halides are well known in literature.

The active form of the magnesium halide in the catalyst components is identified by the X-ray diffraction spectrum of the solid catalyst component wherein the major intensity reflection which appears in the spectrum of the nonactivated magnesium halides (having surface area smaller than 3 m$^2$/g) is no longer present, and in its place there is a halo with the maximum intensity shifted with respect to the position of the major intensity reflection, or the major intensity reflection has diminished in intensity, and gives a half-peak breadth at least 30% greater than the one of the major intensity reflection which appears in the spectrum of the nonactivated Mg halide.

The most active forms of magnesium halide are those in which the halo appears in the X-ray spectrum of the solid catalyst component.

Among the magnesium halides, the chloride is the preferred compound. In case of the most active forms of the magnesium chloride, in the X-ray spectrum of the catalyst component appears a halo in place of the reflection which in the magnesium chloride spectrum is situated at the interplanar distance of 2.56Å.

The methods mentioned above can be used also in the case of the solid catalyst components containing electron-donors which have the characteristics indicated in U.S. Pat. No. 4,544,713.

The solid catalyst components containing the silicon compound according to the invention form, by reaction with the Al-alkyl compounds, catalysts which can be used in the polymerization of CH$_2$=CHR olefins, where R is hydrogen, a 1–6 carbon linear or branched alkyl, or an aryl, or mixtures of said olefins or mixtures of one or more of said olefins with diolefins.

In the case of polymerization of said CH$_2$=CHR olefins, particularly when the olefin is propylene, the Al-alkyl compounds that can be used are selected from Al-trialkyl, such as Al-triethyl, Al-triisobutyl, Al-tri-n-butyl, and linear or cyclic Al-alkyl compounds containing two or more Al atoms linked together through O or N atoms, or SO$_4$ and SO$_3$ groups.

Examples of said compounds are:

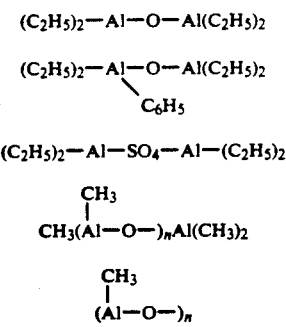

where n is a number from 1 to 20.

AlR$_2$OR' compounds, where R' is an aryl radical substituted in position 2 and/or 6 and R is a 1–8 carbon alkyl radical, can also be used as well as AlR$_2$H compounds where R has the meaning already indicated.

The Al-alkyl compound is used in Al/Ti molar ratios usually from 1 to 1000.

In the case of the polymerization of propylene and similar alpha-olefins, the trialkyl aluminum compounds can be used in a mixture with Al-alkyl halides, such as AlEt$_2$Cl and Al$_2$Et$_3$Cl$_3$.

The Al-alkyl compounds indicated above can also be used in cases where the silicon compound of the invention is used as an outside donor, i.e. added to the Al-alkyl compound. In this case, the solid catalyst component contains an electron-donor compound which has the same characteristics indicated in U.S. Pat. No. 4,522,930.

The polymerization of the alpha-olefins is carried out according to known methods operating in liquid phase constituted by the monomer, or monomers, or by a solution of same in an aliphatic or aromatic hydrocarbon solvent, or in gas phase, or also by combining polymerization stages in liquid phase and in gas phase.

The (co)polymerization temperature is usually from 0° to 150° C.; preferably from 60° to 100° C., it is operated at atmospheric pressure or higher. The catalysts can be precontacted with small amounts of olefins (prepolymerization). The prepolymerization improves the performance of the catalysts as well as the morphology of the polymers. The prepolymerization is carried out maintaining the catalyst in suspension in a hydrocarbon solvent (hexane, heptane, etc.) and it is polymerized at a temperature from room temperature to 60° C. producing an amount of polymer generally from 0.5 to 3 times the weight of the catalyst. It can also be carried out in liquid propylene, under the temperature conditions indicated above, and producing amounts of polymer which can reach 1000 g per g of catalyst component.

In the case of stereoregular polymerization of olefins, if an electron-donor compound is added to the Al-alkyl, the molar ratio between Al-alkyl compound and electron-donor compound is usually from 5:1 to 100:1.

The following examples are provided to illustrate and not to limit the invention.

EXAMPLES 1–6

1000 ml of n-heptane, 5 mmoles of Al(C$_2$H$_5$)$_3$, 30 mg of catalyst component and 1 mmole of an electron-donor compound are introduced in propylene gas stream at 25° C. in a 2000 ml stainless steel autoclave with an anchor agitator. The autoclave is closed and the pressure brought to 1 atm by feeding propylene, after which a hydrogen overpressure of to 0.2 atom is introduced. Then the contents are heated to 70° C. and the total pressure is brought to 7 atom with propylene.

The polymerization reaction is continued for 2 hours while the monomer is fed continuously. The polymer obtained is then isolated by filtration. The polymer remaining in the filtrate is precipitated with methanol, vacuum dried and considered in determining the total residue of the n-heptane extraction.

The electron-donors used, the polymerization yields and the properties of the polymers obtained are shown in Table 1.

The catalyst component used is prepared as follows.

In a 500 ml reactor equipped with a filtering baffle 225 ml of TiCl$_4$ are introduced at 0° C. While agitating, 10.1 g (54 mmoles) of microspheroidal MgCl$_2$2,1C$_2$H$_5$OH, obtained according to the method of example 1 of U.S. Pat. No. 4,469,648, are added over 15 minutes.

Once the addition is completed, the temperature is brought to 40° C. and 9 mmoles of diisobutylphthalate are introduced. The temperature is brought to 100° C. in 1 hour and it is reacted for 2 hours after which the TiCl$_4$ is removed by filtration, then another 200 ml of TiCl$_4$ are added and it is reacted at 120° C. for 1 hour; the mixture product is filtered and washed at 60° C.

with n-heptane until no chlorine ions remain in the filtrate.

EXAMPLES 7-12

In a 1 litre glass flask, equipped with a condenser, mechanical agitator and thermometer 625 ml of $TiCl_4$ are introduced under an anhydrous nitrogen atmosphere. 25 g of spherical $MgCl_2;2,1C_2H_5OH$ support, obtained according to the methods of example 1 of U.S. Pat. No. 4,469,648, are fed under agitation at 0° C.

The reaction mixture is heated to 100° C. over 1 hour period. When the temperature reaches 40° C. 22 mmoles of the electron-donor indicated in Table 2 are introduced. The reaction mixture is maintained at 100° C. for 2 hours, then allowed to settle and the liquid is syphoned off. 550 ml of $TiCl_4$ are then added and the contents heated to 120° C. for 1 hour. The reaction mixture is then allowed to settle and the liquid is syphoned off. The remaining solid is washed 6 times with 200 cc of anhydrous hexane at 60° C. and 3 times at room temperature.

The analytical data relative to the catalyst components are shown in Table 2.

EXAMPLES 13-18

In a 2000 ml stainless steel autoclave with an anchor agitator 1000 ml of n-heptane, 2.5 mmoles of $Al(C_2H_5)_3$ and a suitable amount of the catalyst component prepared according to Examples 7-12 are introduced under propylene stream at 25° C. The autoclave is closed and the pressure brought to 1 atom by feeding propylene, after which a hydrogen overpressure of 0.2 atm is introduced.

The contents are heated to 70° C. and the total pressure is brought to 7 atm with propylene. The polymerization reaction is continued for 2 hours while the monomer is fed continuously and the temperature is maintained at 70° C.

The polymer obtained is then isolated by filtration and dried. The polymer remaining in the filtrate is precipitate with methanol, vacuum dried and considered in determining the total residue of the n-heptane extraction The amounts of the catalyst component used, the polymerization yields and the properties of the polymers obtained are shown in Table 3.

TABLE 1

| Ex. no. | Donor used | Yield gPP/g cat. comp. | I.I. % | I.V. dl/g |
|---|---|---|---|---|
| 1 | methyl-phenyl-dimethoxymethyl-silane | 1000 | 92.7 | 1.60 |
| 2 | diphenyl-dimethoxymethylsilane | 5000 | 95.3 | 1.50 |
| 3 | methyl-cyclohexyl-dimethoxy-methylsilane | 3800 | 92.8 | 1.38 |
| 4 | di-tert-butyl-dimethoxymethyl-silane | 3500 | 92.7 | 1.30 |
| 5 | cyclohexyl-tert-butyl-dimethoxy-methylsilane | 5500 | 94.2 | 1.55 |
| 6 | isopropyl-tert-butyl-dimethoxy-methylsilane | 4800 | 95.5 | 1.50 |

TABLE 2

| Ex no. | Donor used | Catalyst comp. Composition % by weight | | |
|---|---|---|---|---|
| | | Mg | Ti | Donor |
| 7 | methyl-phenyl-dimethoxy-methyl-silane | 13.6 | 6.2 | 15.4 |
| 8 | diphenyl-dimethoxymethylsilane | 13.4 | 6.1 | 16.9 |
| 9 | methyl-cyclohexyl-diemthoxy-methylsilane | 18.0 | 2.5 | 16.7 |
| 10 | di-tert-butyl-dimethoxymethyl-silane | 15.1 | 5.3 | 15.8 |
| 11 | cyclohexyl-tert-butyl-dimethoxy-methylsilane | 17.0 | 2.1 | 17.8 |
| 12 | isopropyl-tert-butyl-dimethoxy-methylsilane | 17.5 | 2.4 | 15.0 |

TABLE 3

| Ex. no. | Catalyst Ex. no. (amount in mg.) | Yield gPP/g cat. comp. | I.I. % | I.V. dl/g |
|---|---|---|---|---|
| 13 | 7 (15) | 13000 | 74.0 | 1.50 |
| 14 | 8 (12) | 12200 | 72.2 | 1.68 |
| 15 | 9 (10) | 22500 | 82.6 | 1.61 |
| 16 | 10 (13) | 15100 | 77.1 | 1.57 |
| 17 | 11 (11) | 16500 | 91.1 | 1.40 |
| 18 | 12 (10) | 17000 | 91.7 | 1.60 |

EXAMPLE 19

In the same autoclave as used in Examples 1-6, using ethylene instead of propylene, are introduced, at 45° C. under a light hydrogen stream, 900 ml of a 0.5 g/l Al-triisobutyl solution in anhydrous hexane, and immediately thereafter 16 mg of the solid catalyst component of Example 12 suspended in 100 ml of the above mentioned solution.

The temperature is then brought quickly to 75° C., after which hydrogen is fed until a pressure of 4.5 atm is obtained, and then ethylene until a total pressure of 11.5 atm is obtained. These conditions are maintained for 3 hours continuously replacing the ethylene consumed. The autoclave is then quickly vented and cooled to room temperature. The polymeric suspension is filtered and the solid is dried.

In this manner 350 g of polymer are obtained (corresponding to a yield of 22 Kg/g of catalyst) having the following characteristics determined by standard methods:

MIE=1.70 g/10 min (MIF/MIE=26.5)

MIF=46 g/10 min $[\eta]135°$ C. THN-1.8 dl/g

The E and F melt indexes have been determined according to ASTM D 1238 norms —E and F conditions respectively.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A solid catalyst component for the polymerization of olefins comprising a titanium halide or alkoxy titanium halide and a silicon compound of the formula

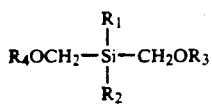

where $R_1$ and $R_2$ are the same or different and are linear or branched $C_{1-18}$ alkyl, $C_{3-18}$ cycloalkyl, $C_{6-18}$ aryl, $C_{7-18}$ alkaryl or $C_{7-18}$ aralkyl radicals, optionally containing O, N, S, P, or halogen, and $R_3$ and $R_4$ are the same or different and are linear or branched $C_{1-18}$ alkyl, $C_{3-18}$ cycloalkyl, $C_{6-18}$ aryl, $C_{7-18}$ alkaryl or $C_{7-18}$ aralkyl radicals, said titanium halide or alkoxy titanium halide and said silicon compound being supported on a magnesium halide in active form.

2. The solid catalyst component of claim 1, where $R_1$ and $R_2$ are selected from the group consisting of methyl, ethyl, propyl, isopropyl, n-butyl, tert-butyl, sec-butyl, neo-pentyl, 2-ethylhexyl, cyclohexyl, methylcyclohexyl, phenyl, benzyl, p-chlorophenyl, 1-naphthyl and 1-decaydronaphthyl.

3. The solid catalyst component of claim 1, where the titanium compound is titanium tetrachloride and the magnesium halide is magnesium dichloride.

4. The solid catalyst component of claim 1, where the silicon compound is selected from the group consisting of methylcyclohexyldimethoxymethylsilane, cyclohexyl-tert-butyldimethoxymethysilane and isopropyl-tert-butyl-dimethoxymethylsilane.

5. A catalyst for the polymerization of olefins comprising the product of the reaction of the solid catalyst component of claim 1 and an Al-trialkyl compound.

6. A catalyst for the polymerization of olefins comprising the product of the reaction of the solid catalyst component of claim 3 and an Al-trialkyl compound.

7. A catalyst for the polymerization of olefins comprising the product of the reaction of an Al-trialkyl compound and a silicon compound having the formula

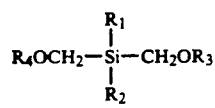

where $R_1$ and $R_2$ are the same or different and are linear or branched C1-18 alkyl, $C_{3-18}$ cycloalkyl, $C_{6-18}$ aryl, $C_{7-18}$ alkaryl, or $C_{7-18}$ aralkyl radicals, optionally containing O, N, S, P, or halogen, and $R_3$ and $R_4$ are the same or different and are linear or branched C1-18 alkyl, $C_{3-18}$ cycloalkyl, $C_{6-18}$ aryl, $C_{7-18}$ alkaryl, or $C_{7-18}$ aralkyl radicals, with a solid catalyst component comprising a magnesium halide in active form, a titanium halide or alkoxy titanium halide and an electron-donor compound at least 70% moles of which is extractable with Al-triethyl under standard extraction conditions, wherein the solid component, after extraction, has a surface area greater than 10 m²/g.

8. The catalyst of claim 7, where the electron-donor compound present in the solid component is a phthalic acid ester.

9. The catalyst of claim 8, where the silicon compound is diphenyldimethoxymethylsilane, cyclohexyl-tert-butyldimethoxymethylsilane or isopropyl-tert-butyl-dimethoxymethylsilane.

* * * * *

UNITED STATES PATENT AND TRADEMARK OFFICE
CERTIFICATE OF CORRECTION

PATENT NO. : 5,106,807

DATED : April 21, 1992

INVENTOR(S) : Morini et al

It is certified that error appears in the above-identified patent and that said Letters Patent is hereby corrected as shown below:

col. 1, line 33, delete "(HM 3983 USA)".

col. 3, line 6, before "butox-" insert --tetra-i- --.

col. 3, line 64, change "$MgCl_2nROH$" to --$MgCl_2 \cdot nROH$--.

col. 4, line 14, change "$MgCl_22Ti(OC_4H9)_4$" to --$MgCl_2 \cdot 2Ti(OC_4H_9)_4$--.

col. 4, line 54, correct typographical error "o" should be --on--.

col. 6, line 44, change "atom" to --atm--.

col. 6, line 58, change "$MgCl_22,1C_2,H5OH$" to --$MgCl_2 \cdot 2.1C_2H_5OH$--.

col. 7, line 8, change "$MgCl_2; 2,1C_2H_5OH$" to --$MgCl_2 \cdot 2.1C_2H_5OH$--.

col. 7, line 27, "$Al(C2H5)3$" to --$Al(C_2H_5)_3$--.

col. 7, line 31, change "atom" to --atm--.

col. 10, line 18, change "Cl-18" to --$C_{1-18}$--.

col. 10, line 21, change "Cl-18" to --$C_{1-18}$--.

Signed and Sealed this

Sixteenth Day of November, 1993

Attest:

BRUCE LEHMAN

*Attesting Officer*  *Commissioner of Patents and Trademarks*